United States Patent
Menjak et al.

(10) Patent No.: US 6,705,419 B2
(45) Date of Patent: Mar. 16, 2004

(54) DRIVE-BY-WIRE STEERING SYSTEMS HAVING A CENTER FEEL MECHANISM AND METHODS OF PROVIDING

(75) Inventors: Ratko Menjak, Frankenmuth, MI (US); Zdravko Menjak, Frankenmuth, MI (US)

(73) Assignee: Delphi Technologies, Inc., Troy, MI (US)

( * ) Notice: Subject to any disclaimer, the term of this patent is extended or adjusted under 35 U.S.C. 154(b) by 50 days.

(21) Appl. No.: 10/060,528

(22) Filed: Jan. 30, 2002

(65) Prior Publication Data

US 2003/0141135 A1 Jul. 31, 2003

(51) Int. Cl.[7] .................................................. B62D 5/04
(52) U.S. Cl. ...................................... 180/402; 180/444
(58) Field of Search ............................... 180/402, 444, 180/443; 280/89

(56) References Cited

U.S. PATENT DOCUMENTS

| | | | |
|---|---|---|---|
| 4,153,133 A | | 5/1979 | Anderson .................... 180/154 |
| 4,570,734 A | * | 2/1986 | Taig ............................ 180/444 |
| 4,658,927 A | * | 4/1987 | Kanazawa ................... 180/422 |
| 5,251,135 A | | 10/1993 | Serizawa et al. ...... 364/424.05 |
| 5,803,202 A | * | 9/1998 | Bohner et al. .............. 180/443 |
| 5,896,942 A | * | 4/1999 | Bohner et al. .............. 180/402 |
| 5,908,457 A | | 6/1999 | Higashira et al. ............. 701/41 |
| 6,012,540 A | | 1/2000 | Bohner et al. .............. 180/402 |
| 6,035,251 A | | 3/2000 | Hac et al. ...................... 701/70 |
| 6,041,882 A | | 3/2000 | Bohner et al. .............. 180/402 |
| 6,059,068 A | | 5/2000 | Kato et al. .................. 180/402 |
| 6,069,505 A | | 5/2000 | Babanezhad ................ 327/156 |
| 6,072,293 A | | 6/2000 | Shimizu et al. ............. 318/432 |
| 6,170,599 B1 | * | 1/2001 | Kikuti et al. ............... 180/421 |
| 6,176,341 B1 | | 1/2001 | Ansari ........................ 180/402 |
| 6,283,243 B1 | | 9/2001 | Bohner et al. .............. 180/406 |
| 6,367,577 B2 | * | 4/2002 | Murata et al. .............. 180/446 |
| 6,547,029 B2 | * | 4/2003 | Peppler et al. .............. 180/402 |

FOREIGN PATENT DOCUMENTS

| EP | 0 442 570 A1 | 9/1991 |
|---|---|---|
| EP | 0 726 193 A2 | 6/1996 |

* cited by examiner

Primary Examiner—Avraham Lerner
(74) Attorney, Agent, or Firm—Michael D. Smith

(57) ABSTRACT

A drive-by wire steering system is provided. The system comprises a steering shaft and a center feel mechanism. The steering shaft is configured for a first angular displacement about a first axis. The steering shaft has a first geared portion and a first end connectable to a vehicle's steering wheel. The center feel mechanism comprises a cam face, an urging member and a second geared portion. The first geared portion and the second geared portion are operatively engaged such that the first angular displacement of the steering shaft imparts a second angular displacement about a second axis to the center feel mechanism. The cam face and the urging member are configured to generate a retuning torque to the center feel mechanism. The retuning torque has a direction opposite the second angular displacement.

21 Claims, 5 Drawing Sheets

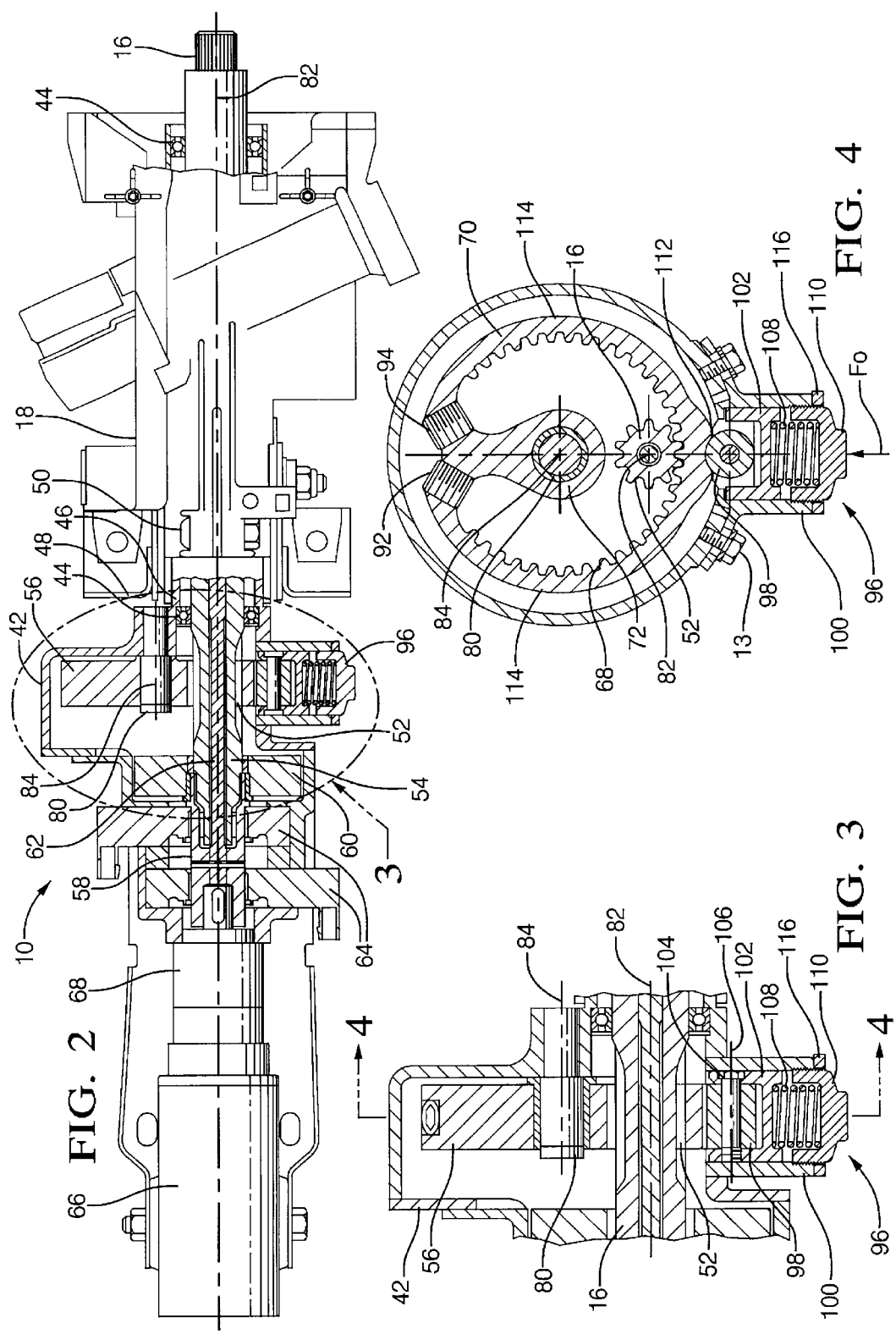

DRIVE-BY-WIRE STEERING SYSTEMS HAVING A CENTER FEEL MECHANISM AND METHODS OF PROVIDING

TECHNICAL FIELD

This disclosure relates generally to drive-by-wire steering systems. More specifically, this disclosure relates to drive-by-wire steering systems having a center feel mechanism, and methods of providing such steering systems with a center feel.

BACKGROUND

Vehicles require a steering system to control the direction of travel. Previously, mechanical steering systems have been used. Mechanical steering systems typically include a mechanical linkage or a mechanical connection between the steering wheel and the vehicle's road wheels. Thus, movement of the steering wheel causes a corresponding movement of the road wheels. Movement of such mechanical systems is often power assisted through the use of hydraulic assists or electric motors.

Mechanical steering systems are being replaced and/or supplemented by electrically driven steering systems, commonly known as "steer-by-wire" systems. Such steer-by-wire systems to varying extents replace, for example, the mechanical linkage between the steering wheel and the vehicle wheels with an electrically assisted system.

This migration to steer-by-wire systems is being made to improve fuel economy, increase vehicle modularity, reduce load on the engine of the vehicle, reduce vehicle weight, and provide four-wheel-steering. For example, the use of steer-by-wire systems eliminates the need for hydraulic fluids, provides a tighter turning radius, and reduces the weight of the vehicle.

Additionally, steer-by-wire systems eliminate various undesirable problems present in mechanical systems. For example in steer-by-wire systems, the steering wheel is mechanically isolated from the road wheels. Thus, excessive deleterious feed back to the steering wheel in the form of shudders, and steering wheel kickback from the road wheels is eliminated.

Unfortunately, mechanically isolating the steering wheel from the road wheel also eliminates desired feed back. For example, during the use of mechanical steering systems, an operator applies a force to the steering wheel to turn the road wheels of the vehicle. After releasing the turning force on the steering wheel, the gyroscopic and other forces on the road wheels tend to act on the mechanical steering system to return the steering wheel to its normal or center position. Unfortunately, the mechanical isolation provided by drive-by-wire steering systems eliminates this desired feedback. Namely, during the use of drive-by-wire steering systems, the steering wheel maintains its turned position after being released instead or returning to its center position.

In vehicles having mechanical steering systems, the force applied by the operator to the steering wheel to turn the road wheels of the vehicle is typically proportion to the amount or degree of vehicle turn desired. Namely, in order to turn the vehicle slightly, only a slight force must be applied to the steering wheel. Conversely, in order to turn the vehicle sharply, a large force must be applied. It is known to provide mechanical steering systems with power assistance through the use of hydraulic assists or electric motors to reduce the amount of force applied to the steering wheel necessary to turn the road wheels. Thus, it has been seen that "over assisting" by removing all of the force associated with turning the vehicle, or even making the force required to turn the vehicle constant regardless of the degree of turn changes the "feel" of the steering system.

In mechanical systems, the amount of assistance applied by the hydraulic assists or electric motors has been regulated so as to avoid these "over assist" problems. However, during the use of drive-by-wire steering systems the force applied to the steering wheel necessary to turn the wheels is both minimal and constant due to the mechanical isolation of the steering wheel from the road wheels. Thus, prior drive-by-wire steering systems often suffer from the same problems experienced in overly assisted mechanical steering systems.

SUMMARY

A drive-by wire steering system is provided. The system comprises a steering shaft and a center feel mechanism. The steering shaft is configured for a first angular displacement about a first axis. The steering shaft has a first geared portion and a first end connectable to a vehicle's steering wheel. The center feel mechanism comprises a cam face, an urging member and a second geared portion. The first geared portion and the second geared portion are operatively engaged such that the first angular displacement of the steering shaft imparts a second angular displacement about a second axis to the center feel mechanism. The cam face and the urging member are configured to generate a retuning torque to the center feel mechanism. The retuning torque has a direction opposite the second angular displacement.

A method of providing a center feel in a drive-by wire steering system is provided. The method comprises engaging a center feel mechanism to a steering shaft such that an angular displacement of the steering shaft about a first axis imparts a second angular displacement about a second axis to the center feel mechanism. The center feel mechanism comprises a cam face that defines a center position. The method further comprises urging a cam follower into the cam face such that the second angular displacement generates a retuning torque on the center feel mechanism. The retuning torque acts on the center feel mechanism to return and maintain the cam follower at the center position.

A method of improving the driveability of a drive-by wire steering system is provided. The method comprises engaging a center feel mechanism to a steering shaft such that an angular displacement of the steering shaft about a first axis imparts a second angular displacement about a second axis to the center feel mechanism. The center feel mechanism comprises a cam face having a cam profile. The method further comprises biasing a cam follower into the cam face such that the angular displacement of the steering shaft generates a retuning torque on the center feel mechanism. The retuning torque has a direction opposite the angular displacement, and is proportional to the angular displacement.

The above-described and other features are appreciated and understood by those skilled in the art from the following detailed description, drawings, and appended claims.

DESCRIPTION OF THE DRAWINGS

FIG. 2 is a sectional view of an exemplary embodiment of steer-by wire system;

FIG. 3 is an exemplary embodiment of a return to center mechanism of the steer-by wire system of FIG. 2, taken along circle 3—3;

FIG. 4 is a sectional view of the center feel mechanism of FIG. 3, taken along lines 4—4;

DESCRIPTION OF THE PREFERRED EMBODIMENT

Figure 1:
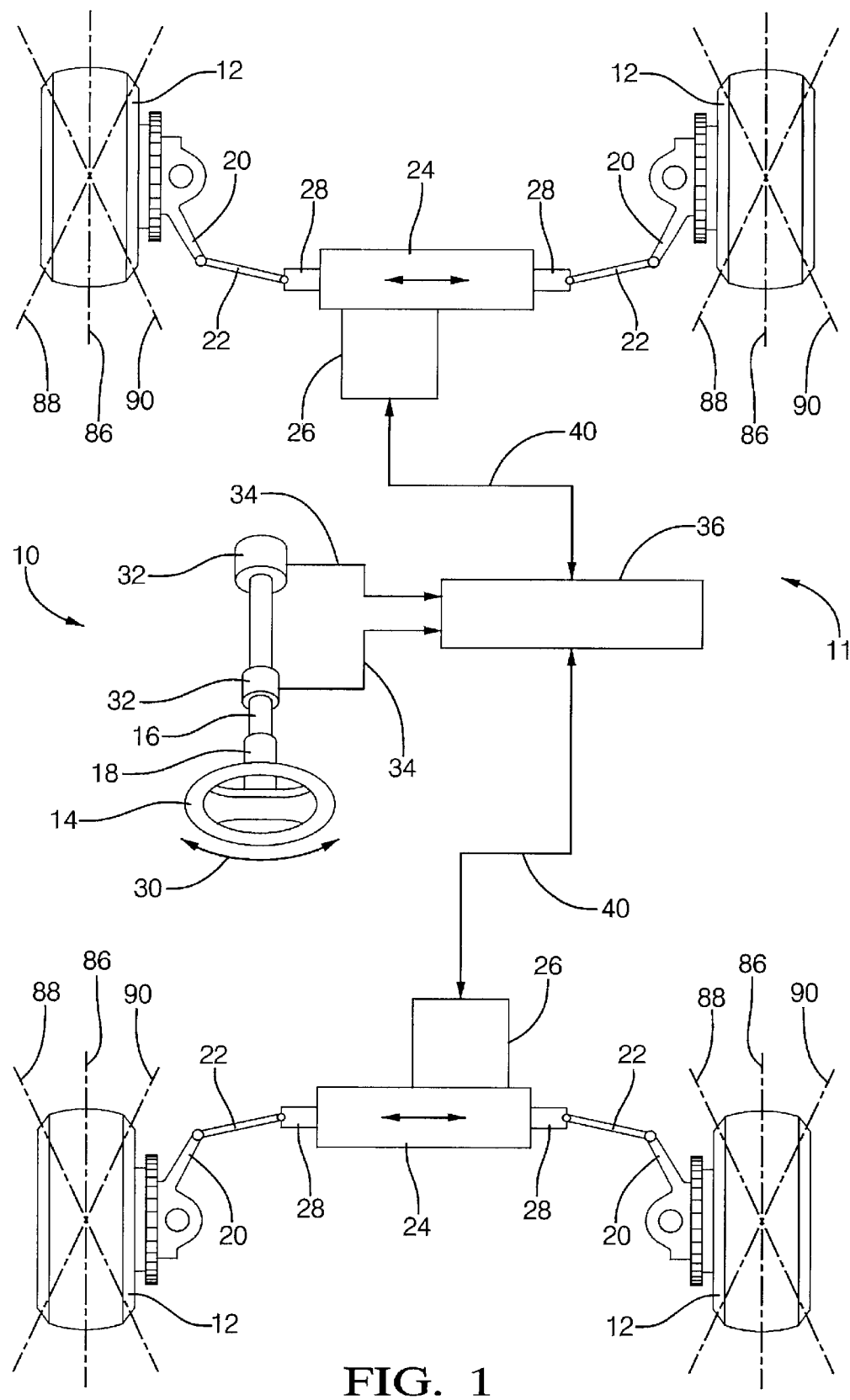
FIG. 1 is a schematic view of a steer-by wire system for a vehicle.
Figure 5:
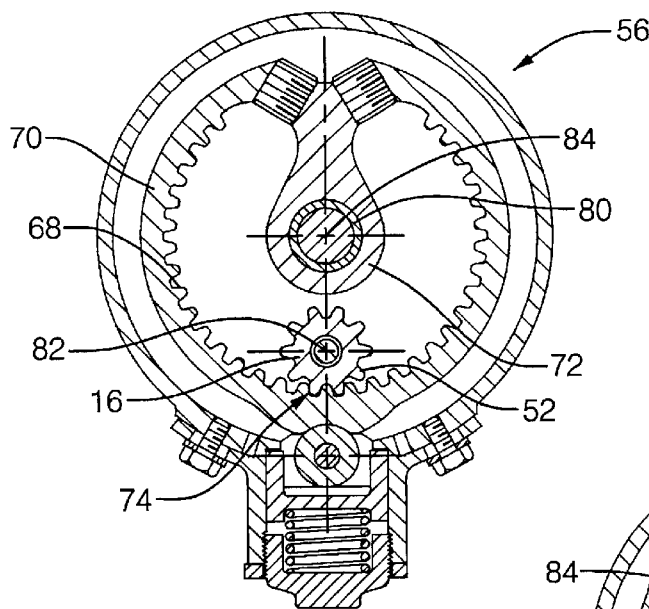
FIG. 5 is a view of the center feel mechanism of FIG. 4 in a first position.

Referring now to FIG. 1, a drive-by-wire steering system 10 for use in a vehicle 11 is illustrated. The steering system 10 allows the operator of the vehicle 11 to control the direction of the road wheels 12 of the vehicle through the manipulation of a steering wheel 14. The steering wheel 14 is operatively coupled to a steering column or shaft 16. The steering column 16 is installed in a main housing 18 such that the column is rotatable within the housing.

The road wheels 12 are connected to knuckles 20, which are in turn connected to tie rods 22. The tie rods 22 are connected to a steering assembly 24. The steering assembly 24 includes an electric motor 26 and a steering rod 28. The steering rod 28 is operatively coupled to the electric motor 26 such that the motor is adapted to move the steering rod. The movement of the steering rod 28 controls the direction of the road wheels 12 through the knuckles 20 and tie rods 22 in a known manner.

One or more sensors 32 detect angular displacement or travel 30 of the steering column 16, as well as detecting the torque of the angular displacement. The sensors 32 provide electric signals 34 to a controller 36 indicative of the angular displacement 30 and torque. The controller 36 sends and receives signals 40 to/from the electric motor 26 to actuate the electric motor in response to the angular displacement 30 of the steering wheel 14.

In use, the steering wheel 14 is angularly displaced 30 such that the steering column 16 is also angularly displaced. The sensors 32 detect the angular displacement 30 of the column 16, and the sensors send the signals 34 to the controller 36 indicative of the relative amount of the angular displacement of the column. The controller 36 sends the signals 40 to the motor 26 indicative of the relative amount of angular displacement 30, which in turn laterally moves the steering rod 28. Thus, the controller 36 controls the distance that the steering rod 28 is moved based on the amount of the angular displacement 30 of the column 16. The movement of the steering rod 28 manipulates the tie rods 22 and knuckles 20 to reposition the road wheels 12 of the vehicle 11. Accordingly, when the steering wheel 14 is turned, the road wheels 12 are turned.

In mechanical steering systems, the rotation of the steering wheel 14 is limited by the travel of the road wheels 12. The travel of the road wheels is usually equal to a rotation of the steering wheel 14 of about 1.5 times in either direction. However, in the drive-by-wire steering system 10 the steering wheel 14 is mechanically isolated from road wheels 12. Thus, in the drive-by-wire steering system 10 the rotation of the steering wheel 14 is not limited.

Now, it has been determined that limiting the rotation of the steering wheel 14 to about 1.5 times in either direction (e.g. about ±540°) is desirable. Also, limiting movement of the steering wheel 14 to about ±540° protects the sensors 32 from over rotation.

Referring now to FIG. 2, an exemplary embodiment of a drive-by-wire system 10 is shown. Here, the steering column 16 is rotatably mounted in the main housing 18 and a lower housing 42 by way of bearings 44. The lower housing 42 has an upper portion 46 that is connected to a lower portion 48 of main housing 18. For example, a bolt 50 secures the lower housing 42 and the main housing 18. Of course other means of connection are contemplated.

The steering column 16 includes a geared portion 52 defined at its lower end 54, namely at the end opposite the steering wheel 14. The geared portion 54 is in operative contact with a center feel mechanism 56. The center feel mechanism 56, as well as the geared portion 52 of the steering column 16, is housed within the lower housing 42.

The lower end 54 of the steering column 16 is operatively coupled to a secondary shaft 58 by way of a torque sensor 60 having a torsion bar 62. Additionally, position sensors 64 are operatively positioned proximate the steering column 16 and/or the secondary shaft 58 to detect the angular displacement 30 of the steering column and/or the secondary shaft, respectively. The sensors 60 and 64 provide the signals 34 to the controller 36.

For example, the sensor 60 detects characteristics of the movement or angular rotation 30 of the steering column 16 by detecting the torque and speed of the angular displacement of the steering column. However, the sensor 60 operates within a predetermined range of motion. Namely, the sensor 60 typically has a range of motion of about ±540°.

The secondary shaft 58 is connected to an electric servomotor 66 through a planetary gear reducer 68. The motor 66 is operatively connected to the controller 36. The motor 66, as controlled by controller 36, is configured to angularly displace 30 the secondary shaft 58, which in turn angularly displaces the steering column 16. Accordingly, the steer-by-wire system 10 is configured to control the direction of the road wheels 12 without the manipulation of steering wheel 14 by the operator, and is configured to communicate road feel to the steering wheel 14.

For example in an exemplary embodiment, the road wheels 12 include a sensor (not shown) configured to detect forces on the road wheels. The sensor provides signals to the controller 36 indicative of such forces on the road wheels 12. The controller 36 actuates the motor 66 in response to such road forces to simulate road feeling on the steering wheel 14.

Also, the motor 66 is used to return or help return the steering wheel 14 to its center position. For example, after turning the vehicle 11, the operator typically releases the steering wheel 14, expecting the steering wheel to return to its center position as in mechanical steering systems. Once the controller 36 detects via the sensors 60 and 64 that the operator has released the steering wheel 14, the controller activates the servomotor 66 to return the steering wheel to its center position as expected.

However, the activation of the motor 66 consumes energy from the battery (not shown) of the vehicle 11, and thus reduces the overall efficiency of the vehicle. Additionally, the motor 66 and the planetary gear reducer 68 add weight and expense to the vehicle 11, and take up valuable space within the vehicle.

Now, it has been determined that the planetary gear reducer 68 can be eliminated and/or reduced in size by incorporating a center feel mechanism 56 into the drive-by-wire system 10. Thus, the drive-by-wire steering system 10 have the center feel mechanism 56 eliminates the cost and weight of the planetary gear reducer 68, and reduces the size of the steering system 10, while eliminating many of the deleterious effects of mechanically isolating the steering wheel 14 from the road wheels 12. Further, it has been determined that the motor 66 can be reduced in size and/or usage by incorporating the center feel mechanism 56 into the drive-by-wire system 10.

A first exemplary embodiment of the center feel mechanism 56 is illustrated in FIGS. 2–7. The center feel mechanism 56 is configured to limit rotation of the steering wheel 14 and the steering column 16 to about 1.5 rotations (e.g., ±540°). The center feel mechanism 56 is configured to provide the steering column 16 with about 1080° of angular displacement 30. Accordingly, the center feel mechanism 56 improves the feel of the steering system 10 by more closely mimicking the feel of mechanical steering systems, and prevents over rotation of the sensors 60 and 64.

Figure 6:
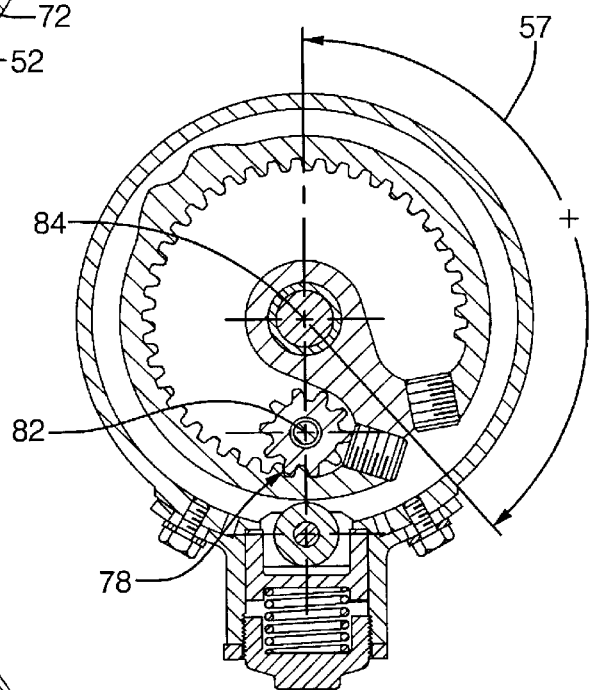
FIG. 6 is a view of the center feel mechanism of FIG. 4 in a second position.
Figure 7:
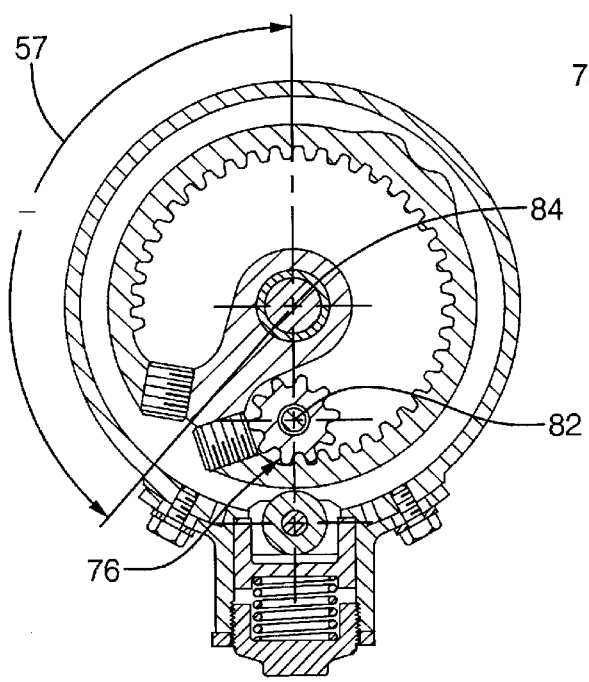
FIG. 7 is a view of the center feel mechanism of FIG. 4 in a third position.

The center feel mechanism 56 includes a geared portion 68, a cam face 70, and a stop portion 72. The center feel mechanism 56 defines a home or center position 74 (FIG. 5), a positive or rightmost position 76 (FIG. 7) and a negative or leftmost position 78 (FIG. 6). The stop portion 72 is defined within the geared portion 68, and is located diametrically opposed from the center position 74. Thus, the center feel mechanism 56 defines the positive position 76 and the negative position 78 on either side of the stop portion 72, respectively.

The center feel mechanism 56 is rotatably mounted on a stop shaft 80 such that the geared portion 68 is engaged with the geared portion 52 of the column 16. Accordingly, the angular displacement 30 of the steering wheel 14 is translated to center feel mechanism 56 by the geared portions 52 and 68. The rotation of the column 16 about an axis or centerline 82 causes the geared portion 52 to drive the geared portion 68 such that the center feel mechanism 56 rotates about its center feel mechanism axis or centerline 84. In sum, the rotation of the column 16 about its centerline 82 causes the geared portion 52 to impart rotation to the drive geared portion 68 such that the center feel mechanism 56 rotates about its centerline 84. The rotation of the center feel mechanism 56 is limited when the center feel mechanism has rotated to the point where the column 16 abuts or interferes with the stop portion 72 at either the positive position 76 (FIG. 7) or the negative position 78 (FIG. 6).

Moreover, the geared portions 52 and 68 are configured such that rotation of the column 16 of about ±540° rotates the center feel mechanism 56 an angle 57 prior to the steering column abutting or interfering with stop portion 72. In an exemplary embodiment, angle 57 is about ±140°. Thus, the angular displacement 30 of the steering wheel 14 of +540° rotates the center feel mechanism 56 +140° from the center position 74 to the positive position 76. Conversely, the angular displacement 30 of the steering wheel 14 −540° rotates the center feel mechanism 56 −140° from the center position 74 to the negative position 78. In sum, the steering column 16 has a total range of motion of about 1080° and the center feel mechanism 56 has a total range of motion of about 280°.

When the center feel mechanism 56 is in the position 74, the steering wheel 14 is in its center or normal position. In this position, the road wheels 12 are pointed parallel to the vehicle 11 (e.g., line 86 in FIG. 1). However, the angular displacement 30 of the steering wheel 14 to its rightmost or positive position causes the center feel mechanism 56 to rotate to the positive position 76. Here, the motor 26 moves the road wheels 12 via the steering assembly 24 such that the road wheels are pointed to the right (e.g., line 88 in FIG. 1). Similarly, the angular displacement 30 of the steering wheel 14 to its negative or leftmost position causes the center feel mechanism 56 to rotate to the negative position 78. Again, at this point the motor 26 moves the road wheels 12 via the steering assembly 24 such that the road wheels 12 are pointed to the left (e.g., line 90 in FIG. 1).

Of course, it should be recognized that the center feel mechanism 56 is described above by way of example as being configured for the angular displacement 30 of the column 16 of about ±540° translating into rotation of the stop portion 72 of about ±140°. The center feel mechanism 56 being configured to provide alternate amounts of angular displacement for the steering wheel 14 and/or center feel mechanism 56 are contemplated.

The steering system 10 having the center feel mechanism 56 provides the drive-by wire steering system with the "feel" of a mechanical steering system. Thus, the steering system 10 improves the "drivability" or "feel" of the vehicles 11 having such drive-by-wire steering systems. Additionally, the steering system 10 having center feel mechanism 56 prevents over rotation of the sensors 60 and 64 beyond a predetermined limit.

As illustrated, the drive-by-wire steering system 10 controls the direction of both the front and rear sets of road wheels 12 of the vehicle 11. However, control of only the front or rear set of road wheels 12 is contemplated. Additionally, the steering system 10 is illustrated controlling the front and rear set of road wheels in a similar direction. Of course, the steering system 10 controlling the front and rear set of road wheels 12 in a different direction, and/or controlling the front and rear set of road wheels in a similar different at some speeds, and a different direction at other speeds are contemplated.

Referring again to FIG. 5, an alternate embodiment of the center feel mechanism 56 is illustrated. Here, the stop portion 72 further includes adjustment screws 92 and 94 shown in phantom. The adjustment screws 92 and 94 are configured to provide the center feel mechanism 56 with the ability to adjust or calibrate the positive position 76 and the negative position 78, respectively. The adjustment screws 92 and 94 are tightenable to the point where the screw(s) protrudes from the stop portion 72 (e.g., past geared portion 68). Conversely, the adjustment screws 92 and 94 are retractable to the point where the screw(s) does not protrude through the stop portion 72.

Thus, with the adjustment screws 92 and 94 protruding past the geared portion 68 the rotation of the center feel mechanism 56 is limited when the center feel mechanism has rotated to the point where the column 16 abuts the adjustment screw 92 at the positive position 76 or the adjustment screw 94 at the negative position 78. Alternately, with the adjustment screws 92 and 94 retracted to the point where the screw(s) do not protrude past the geared portion 68, the rotation of the center feel mechanism 56 is limited when the center feel mechanism has rotated to the point where the column 16 abuts the stop portion 72 at the positive position 76 or the negative position 78. In this manner, the adjustment screws 92 and 94 are configured to make fine tune or calibration type adjustments to angle 57. Thus, in the example where the steering column 16 has a total range of motion of about 1080° and angle 57 of the center feel mechanism 56 of about 280°, the adjustment screws 92 and 94 are configured to make fine tune or calibration type adjustments to the angle 57 of about ±5°.

In sum, one aspect of the center feel mechanism 56 is that it provides the steering system 10 with the stop portion 72 to prevent over rotation of the sensors 60 and 64, and more closely mimics a mechanical steering system by preventing infinite rotation of the steering wheel 14.

Referring again to FIGS. 2–3, the center feel mechanism 56 also provides the steering system 10 with the ability to mimic or simulate a mechanical steering system by providing desired feedback to the steering wheel 14. For example, the center feel mechanism 56 is configured to apply a returning torque (Tr) to the steering wheel 14. The returning torque (Tr) has a direction opposite that of the angular displacement 30. During a turn of the vehicle 11, the returning torque (Tr) provides a resistance to the angular displacement 30 to mimic mechanical steering systems. The center feel mechanism 56 is configured such that the returning torque (Tr) applied to the steering wheel 14 by the center feel mechanism 56 is proportional to the degree of turn of the steering wheel to more closely mimic or simulate the "feel" of a mechanical steering system. Additionally, after the completion of a turn of vehicle 11, returning torque (Tr) acts to return the center feel mechanism 56 to center position 74

The center feel mechanism 56 includes cam face 70 and an urging member 96. The urging member 96 comprises a cam follower 98 biased into operative engagement with cam face 70. Housing 42 includes an extension portion 100 extending radially outward therefrom. The cam follower 98 is rotatably mounted on a riser 102 by way of a bolt 104. Thus, the cam follower 98 is rotatable about an axis 106 that is parallel to the centerline 84 of rotation of the center feel mechanism 56.

A compression member 108 is retained in the extension portion 100 by way of a cap 110. The riser 102 is slidably retained in the extension portion 100 such that the cam follower 98 is moves radially toward and away from the cam face 70. The compression member 108 is exerts a spring force (Fo) on the riser 102 to bias the riser toward the cam face 70 such that the cam follower 98 is in operative engagement with the cam face.

The cam face 70 has a detent 112 defined at the center position 74 and a cam profile 114. The cam profile 114 is defined on both sides of the detent 112, and each side is preferably symmetrical to the other. The cam profile 114 is configured to translate the spring force (Fo) of the compression member 108 into the returning torque (Tr).

In use, the angular displacement 30 of the steering wheel 14 rotates the column 16 about its centerline 82 to cause the geared portion 52 to the drive geared portion 68, which rotates the center feel mechanism 56 about its centerline 84. The rotation of the center feel mechanism 56 about its centerline 84 causes the cam face 70 to act upon the cam follower 98. The cam follower 98 rides along the cam profile 114 of the cam face 70 by overcoming the spring force (Fo) exerted by the compression member 108. By overcoming the spring force (Fo) exerted by the compression member 108, the riser 102 is slid radially away from the cam face, which further compresses the compression member and further increases the spring force (Fo). Thus, the spring force (Fo) of the compression member 108 is translated into the retuning torque (Tr) by the contact of the cam follower 98 and the cam profile 114.

The action of the cam profile 114, the detent 112, and the compression member 108 create the returning torque (Tr) on the center feel mechanism 56. Thus, the center feel mechanism 56 transmits the returning torque (Tr) to the column 16. The returning torque (Tr) has the tendency to return and maintain the steering wheel 14 in position 74 providing the steering system 10 with a center feeling.

The cam profile 114 is configured to provide the returning torque (Tr) with a variable resistance as a function of the amount of the angular displacement 30 of the steering wheel 14. Thus, the center feel mechanism 56 prevents and/or mitigates the feeling that drive-by-wire system 10 "over assists" by removing all of the force associated with turning the vehicle 11, or even making the force required to turn the vehicle constant regardless of the degree of turn. Incorporating the center feel mechanism 56 into the drive-by-wire system 10 enables the elimination of and/or reduction in size of the planetary gear reducer 68. Further, incorporating the center feel mechanism 56 into the drive-by-wire system 10 enables the reduction in size and/or usage of the motor 66.

In an alternate embodiment, the cap 110 is secured to extension portion 100 by way of a thread 116. The thread 116 is configured such that the cap 110 is adjustable to increase and/or decrease the force (Fo) with which the spring 102 biases the follower 98 into the cam face 70.

Figure 8:
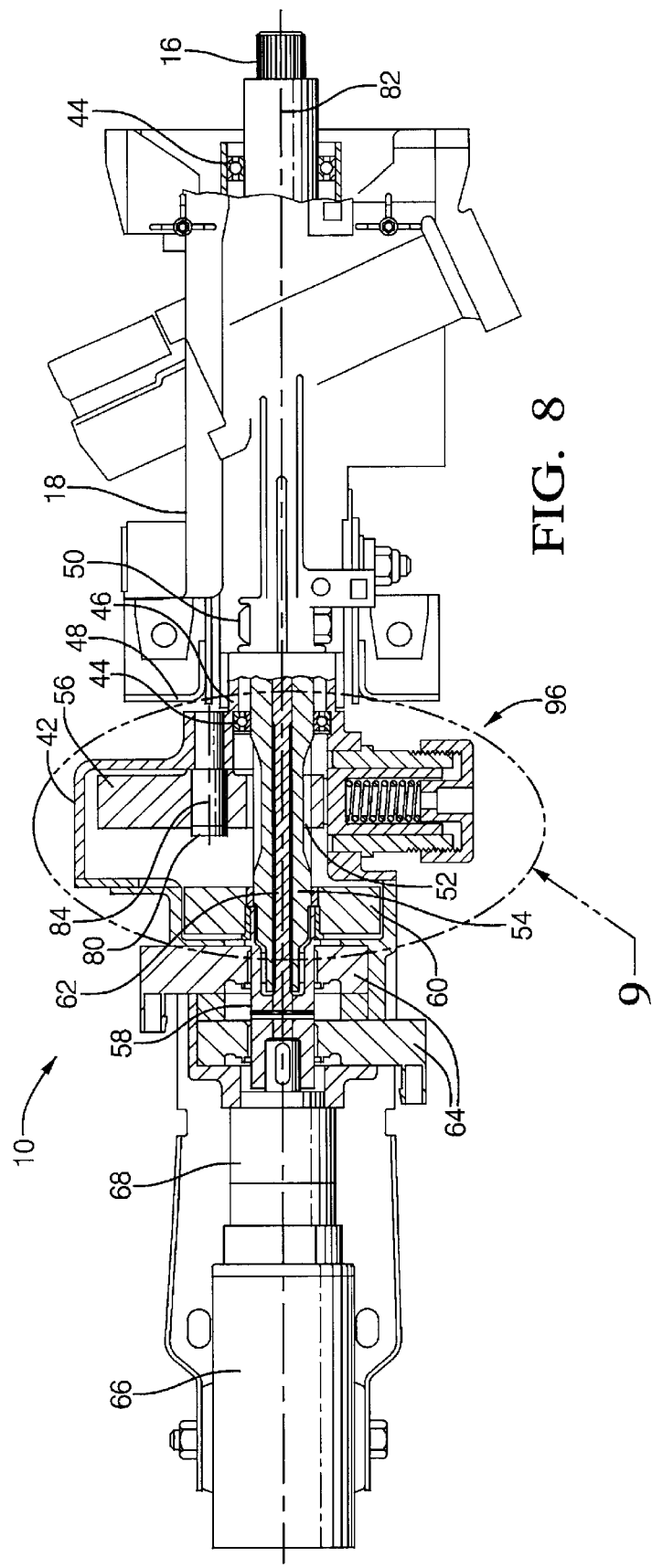
FIG. 8 is a sectional view of an alternated exemplary embodiment of steer-by wire system.
Figure 9:
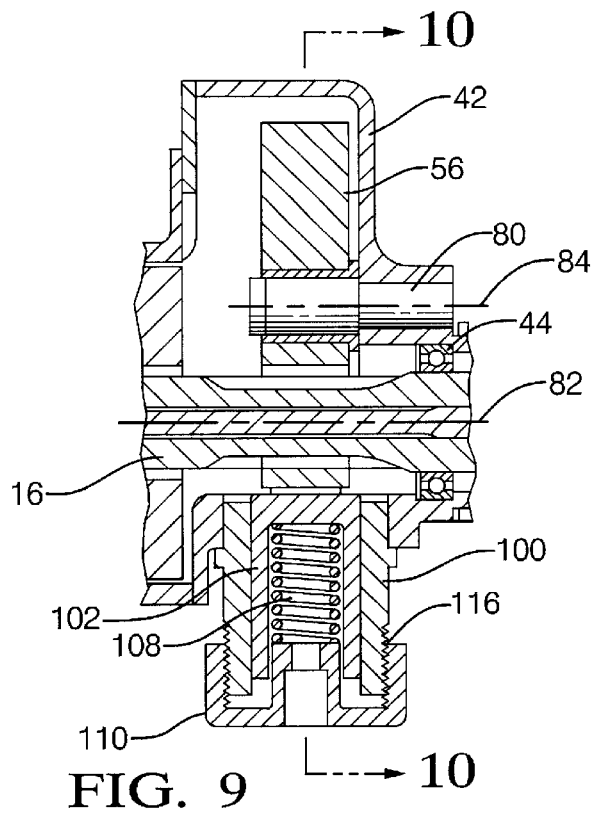
FIG. 9 is an alternate exemplary embodiment of a return to center mechanism of the steer-by wire system of FIG. 8, taken along circle 8—8.
Figure 10:
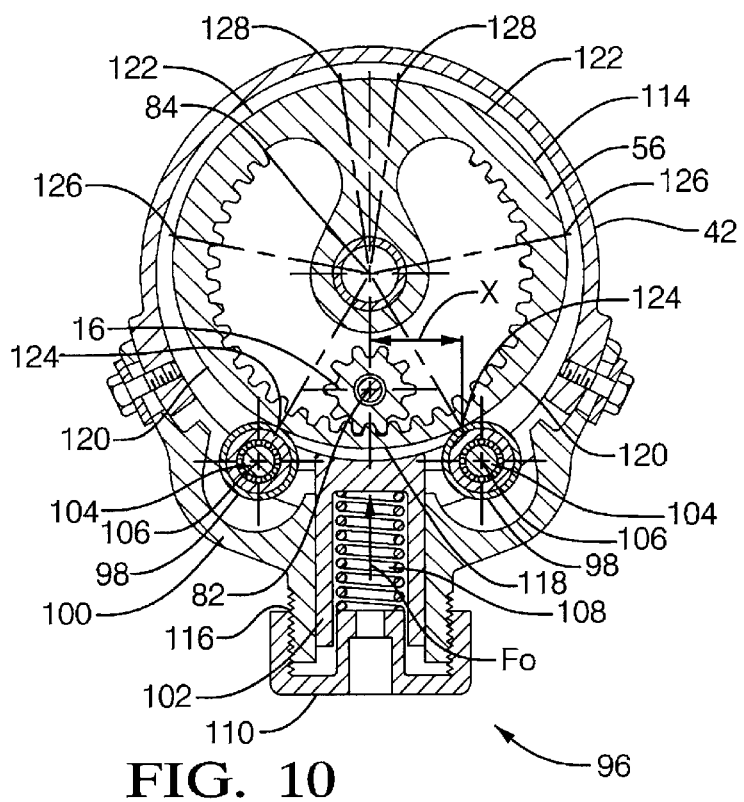
FIG. 10 is a sectional view of the center feel mechanism of FIG. 9, taken along lines 10—10.

A second exemplary embodiment of the center feel mechanism 56 is illustrated in FIGS. 8–10.

Again, the center feel mechanism 56 includes the cam face 70 and the urging member 96. In this embodiment, the urging member 96 comprises two cam followers 98 biased toward the cam face 70. The housing 42 includes an extension portion 100 extending radially outward therefrom. The cam followers 98 are rotatably mounted on the riser 102 by way of bolts 104. Thus, the cam followers 98 are rotatable about axes 106 that are parallel to the centerline 84 of rotation of the center feel mechanism 56.

The compression member 108 is retained in the extension portion 100 by way of the cap 110. The riser 102 is slidably retained in the extension portion 100 such that the cam followers 98 move radially toward and away from the cam face 70. The compression member 108 acts on the riser 102 to slide the riser toward the cam face 70. Here, only one of the cam followers 98 is in operative engagement with the cam face 70.

The cam profile 114 comprises three cam zones, namely a first zone 118, a second zone 120, and a third zone 122. The first zone 118 runs along the cam face 70 between points 124. The second zone 120 runs along the cam face 70 between point 124 and point 126. The third zone 122 runs along the cam face 70 between point 126 and point 128.

The first zone 118 has a constant radius from the centerline 84 of the center feel mechanism 56. The center feel mechanism 56 is at starting position 74 when the cam followers 98 are positioned at points 124, namely when the center feel mechanism is in the first zone 118. The second zones 120 have a radius from the centerline 84 of the center feel mechanism 56 that increases sharply from point 124 to point 126. However, the third zones 122 have a radius from the centerline 84 of the center feel mechanism 56 that increases mildly from point 126 to point 128.

The zones 118, 120, and 122 result in the cam profile 114 providing a variable return torque (Tr) to the steering wheel 14 depending upon the degree of the angular displacement 30. The angular displacement 30 of the steering wheel 14 rotates the column 16 about its centerline 82 such that the center feel mechanism 56 rotates about its centerline 84. The rotation of the center feel mechanism 56 causes the cam face 70 to act upon the cam followers 98. The leading cam follower 98 (i.e., the cam follower in the direction of rotation) rides along the cam profile 114 of the cam face 70 by overcoming the spring force (Fo) exerted by the compression member 108. This slides the riser 102 radially away from the cam face 70. At this point, the trailing cam follower 98 (i.e., the cam follower opposite to the direction of rotation) is no longer in contact with the cam face 70. Thus, the spring forces (Fo) of the compression member 108 are transferred only at the cam follower 98 in contact with the cam face 70.

The returning torque (Tr) is equal to the spring force (Fo) of the compression member 108 multiplied by the distance (X) the spring force is applied from centerline 84 (e.g., Tr=Fo*X). As provided above, the zones 118, 120, and 122 of the cam profile 114 have differing radii, which increase from point 124 to point 128. In use, the angular displacement 30 of the center feel mechanism 56 causes the compression member 108 to be compressed an amount corresponding to the increase in the radii of the cam profile 114. Thus, the spring force (Fo) of the compression member 108 increases as the cam followers 98 are rotated along the cam profile 114. This causes a corresponding increase in the retuning torque (Tr) as the cam followers 98 are rotated along the cam profile 114 away from the center position.

Accordingly, the action of the cam profile 114 and the compression member 108 create the returning torque (Tr) on the center feel mechanism 56. The returning torque (Tr) on the center feel mechanism 56 provides the steering system 10 with the tendency to return and maintain the steering wheel 14 in the center position 74. Additionally, the returning torque (Tr) on the center feel mechanism 56, which increases as the mechanism is angularly rotated 30 from position 74 towards positive or rightmost position 76 and negative or leftmost position 78, provides the steering system 10 with a feel that more closely mimics that of a mechanical steering system.

For example, a return torque (Tr) of about 1 Newton-meter (nm) is required to move center feel mechanism 56 from first zone 118. The angular rotation 30 of the steering wheel 14 from the first zone 118 to the end of second zone 120 (e.g. about ±300° of steering wheel 14 rotation) causes a subsequent increase in the torque from 1 nm to about 3 nm. Finally, the retuning torque (Tr) increases from about 3 nm to about 4.5 nm from the end of second zone 120 to the end of third zone 122 (e.g., about ±300° to about ±540° of steering wheel 14 rotation). It should be recognized that the returning torques (Tr) provided above for the zones 118, 120, and 122 are provided by way of example only. Of course larger or smaller returning torques, more or less cam zones, and the like are contemplated.

It is seen that the center feel mechanism 56 is configured to provide the returning torque (Tr) with a variable resistance as a function of the amount of angular displacement 30 of the steering wheel 14. Thus, the center feel mechanism 56 prevents and/or mitigates the feeling that the drive-by-wire system 10 "over assists" the driver by removing all of the force associated with turning the vehicle 11. Further, the center feel mechanism 56 prevents and/or mitigates the feeling that the drive-by-wire system 10 "over assists" the driver by making the force required to turn the vehicle constant regardless of the degree of turn. Accordingly, incorporating the center feel mechanism 56 into the drive-by-wire system 10 enables the elimination of and/or reduction in size of the planetary gear reducer 68. Further, incorporating the center feel mechanism 56 into the drive-by-wire system 10 enables the reduction in size and/or usage of the motor 66.

In an alternate embodiment, the cap 110 is secured to the extension portion 100 by way of the thread 116. The thread 116 is adjustable to increase and/or decrease the spring force (Fo) with which the compression member 108 biases the follower 98 into the cam face 70. More specifically, the compression member 108 is preloaded to a higher spring force (Fo) by tightening the cap 110 (e.g., towards the center feel mechanism 56), and the compression member is relaxed to a lower spring force (Fo) by loosening the cap (e.g., away from the center feel mechanism 56).

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A drive-by wire steering system, comprising:

a steering shaft being configured for a first angular displacement about a first axis, said steering shaft comprising a first geared portion and a first end, said first end being connectable to a vehicle's steering wheel; and a center feel mechanism comprising a cam face, an urging member and a second geared portion, said first geared portion and said second geared portion being operatively engaged such that said first angular displacement of said steering shaft imparts a second angular displacement about a second axis to said center feel mechanism, said cam face and said urging member being configured to generate a returning torque to said center feel mechanism, said returning torque having a direction opposite said second angular displacement, wherein said cam face comprises a center position and a symmetrical cam profile defined on both sides of said center position, said center position and said symmetrical cam profile being convex relative to an axis of rotation of said cam face.

2. A drive-by wire steering system, comprising:

a steering shaft being configured for a first angular displacement about a first axis, said steering shaft comprising a first geared portion and a first end, said first end being connectable to a vehicle's steering wheel; and a center feel mechanism comprising a cam face, an urging member and a second geared portion, said first geared portion and said second geared portion being operatively engaged such that said first angular displacement of said steering shaft imparts a second angular displacement about a second axis to said center feel mechanism, said cam face and said urging member being configured to generate a returning torque to said center feel mechanism, said returning torque having a direction opposite said second angular displacement, said cam face comprises differing radii, wherein said center feel mechanism further comprises a riser on which a pair of cam followers are mounted for rotation about a third axis, said third axis being parallel to said second axis, said riser being slideable toward and away from said center feel mechanism, said urging member biasing said at least one of said pair of cam followers into operative engagement with said cam face.

3. The drive-by wire steering system of claim 2, wherein said returning torque is proportional to said second angular displacement.

4. The drive-by wire steering system of claim 2, wherein said cam face is configured to translate spring force of said urging member into said returning torque.

5. The drive-by wire steering system of claim 2, wherein said cam face comprises a center position and a symmetrical cam profile defined on both sides of said center position.

6. The drive-by wire steering system of claim 5, wherein said center position comprises a detent.

7. The drive-by wire steering system of claim 2, wherein said center feel mechanism further comprises a riser on which a cam follower is mounted for rotation about a third axis, said third axis being parallel to said second axis, said riser being slideable toward and away from said center feel mechanism, said urging member biasing said cam follower into operative engagement with said cam face.

8. The drive-by wire steering system of claim 7, wherein said spring force of said urging member increases as said cam follower is moved along said cam profile.

9. The drive-by wire steering system of claim 2, wherein rotation of said center feel mechanism about said second axis causes said cam profile to act on one of said pair of cam followers in the direction of the rotation to slide said riser away from said center feel mechanism such that said spring force of said urging member increases as said cam follower is moved along said cam profile.

10. The drive-by wire steering system of claim 9, wherein returning torque is equal to said spring force of said urging member multiplied by a distance said spring force is applied from said second axis.

11. The drive-by wire steering system of claim 10, wherein said spring force is applied from said second axis at a point where said one of said pair of cam followers in the direction of the rotation is in operative engagement with said cam face.

12. A method of providing a center feel in a drive-by wire steering system, comprising:

engaging a center feel mechanism to a steering shaft such that an angular displacement of said steering shaft about a first axis imparts a second angular displacement about a second axis to said center feel mechanism, said center feel mechanism comprising a convex cam face relative to an axis of rotation defining a center position; and urging a cam follower into said cam face such that said second angular displacement generates a returning torque on said center feel mechanism, said returning torque acting on said center feel mechanism to return and maintain said cam follower at said center position.

13. The method of claim 12, further comprising configuring said cam face such that said returning torque is proportional to said second angular displacement.

14. The method of claim 12, further comprising configuring said cam face such that a cam profile comprising differing radii is defined on either side of said center position.

15. The method of claim 14, further comprising configuring said cam face such that cam profile on either side of said center position is symmetrical.

16. The method of claim 14, further comprising configuring said cam face such that spring force of said urging member is translated into said returning torque.

17. The method of claim 14, further comprising disposing a detent at said center position.

18. A method of improving the driveability of a drive-by wire steering system, comprising:

engaging a center feel mechanism to a steering shaft such that an angular displacement of said steering shaft about a first axis imparts a second angular displacement about a second axis to said center feel mechanism, said center feel mechanism comprising a concave cam face relative to an axis of rotation defining a center position; and biasing a cam follower into said cam face such that said angular displacement of said steering shaft generates a returning torque on said center feel mechanism, said returning torque having a direction opposite said angular displacement, and said returning torque being proportional to said angular displacement.

19. The method of claim 18, further comprising configuring said cam face such that a cam profile comprising differing radii is defined on either side of said center position.

20. The method of claim 19, further comprising configuring said cam face such that said cam profile on either side of said center position is symmetrical.

21. The method of claim 20, further comprising configuring said cam face such that spring force of said urging member is translated into said returning torque.

* * * * *